United States Patent
Tong et al.

(10) Patent No.: US 9,250,405 B2
(45) Date of Patent: Feb. 2, 2016

(54) FIBER OPTIC CABLE WITH ELECTRICAL CONNECTORS AT BOTH ENDS, WALL PLATES AND CONTROL BOXES

(71) Applicant: Celerity Technologies Inc., Irvine, CA (US)

(72) Inventors: Xiaolin Tong, Irvine, CA (US); Junxing Cao, Kunshan (CN); Xin Yang, Kunshan (CN)

(73) Assignee: CELERITY TECHNOLOGIES INC., Irvine, CA (US)

( * ) Notice: Subject to any disclaimer, the term of this patent is extended or adjusted under 35 U.S.C. 154(b) by 80 days.

(21) Appl. No.: 14/190,023

(22) Filed: Feb. 25, 2014

(65) Prior Publication Data

US 2014/0178015 A1 Jun. 26, 2014

Related U.S. Application Data

(63) Continuation-in-part of application No. 13/786,867, filed on Mar. 6, 2013, now Pat. No. 9,134,493.

(60) Provisional application No. 61/607,809, filed on Mar. 7, 2012.

(51) Int. Cl.
*G02B 6/42* (2006.01)
*G02B 6/38* (2006.01)
*G02B 6/44* (2006.01)

(52) U.S. Cl.
CPC ............ *G02B 6/4292* (2013.01); *G02B 6/3897* (2013.01); *G02B 6/4261* (2013.01); *G02B 6/4262* (2013.01); *G02B 6/4284* (2013.01); *G02B 6/4466* (2013.01); *G02B 6/4293* (2013.01)

(58) Field of Classification Search
None
See application file for complete search history.

(56) References Cited

U.S. PATENT DOCUMENTS 7,401,985 B2    7/2008   Aronson et al.

FOREIGN PATENT DOCUMENTS

| CN | 201903673 U | 7/2011 |
| CN | 102466841   | 5/2012 |
| WO | 2012059071  | 5/2012 |

*Primary Examiner* — Jerry Rahll
(74) *Attorney, Agent, or Firm* — Chen Yoshimura LLP

(57) ABSTRACT

A connecting device for a fiber optic cable includes a first part having first and second electrical connectors located on its housing, and a second part having a third electrical connector located on its housing. The second and third electrical connectors are adapted to be mechanically and electrically connect with each other or disconnected from each other. The first part has electrical components disposed within its housing and electrically connected to the first and second electrical connectors. The second part receives end portions of optical fibers of the fiber optic cable; it has optical transceivers within its housing but no other electrical circuitry. Also disclosed is a cable device employing an optical fiber cable and two connecting devices at its two ends, at least one of which having a structure described above. Various form factors can be adopted for the first part, including a plug, wall plate, standalone box, etc.

13 Claims, 7 Drawing Sheets

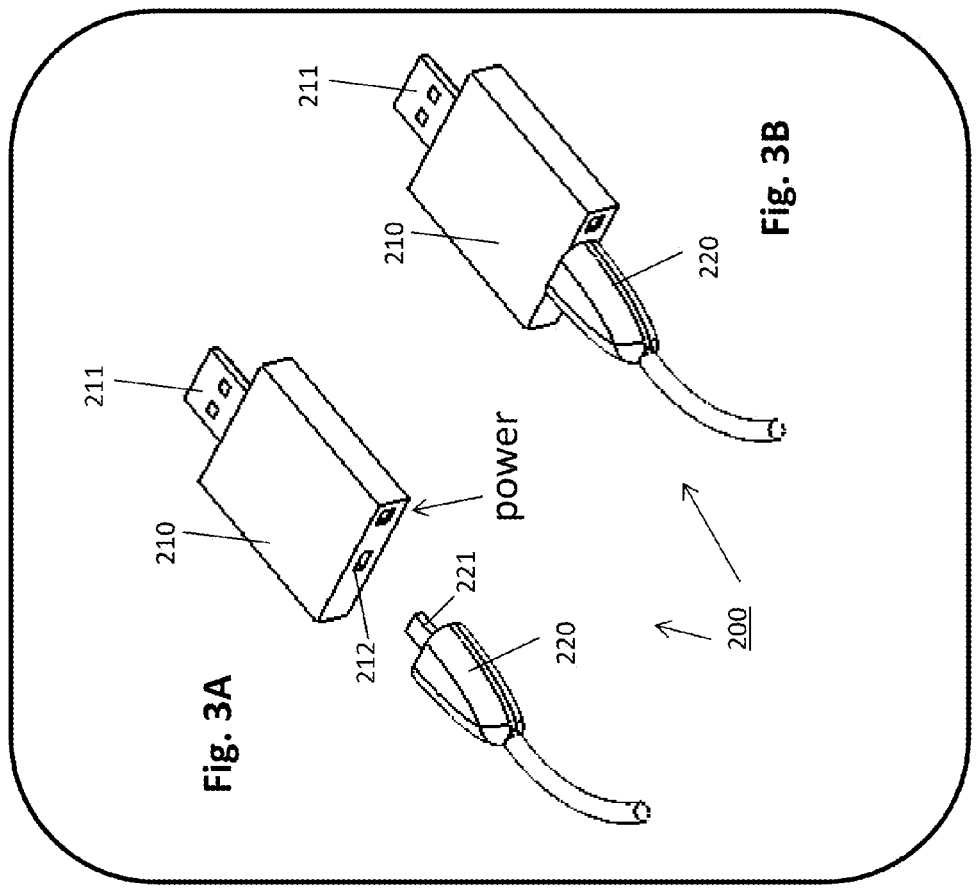
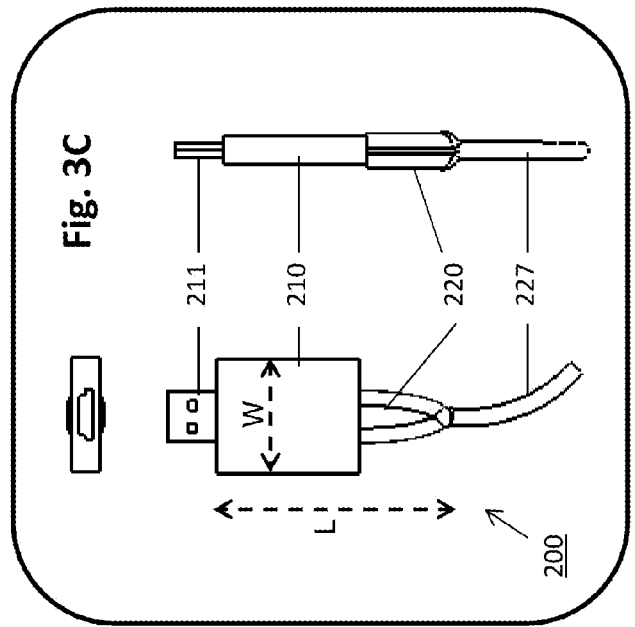

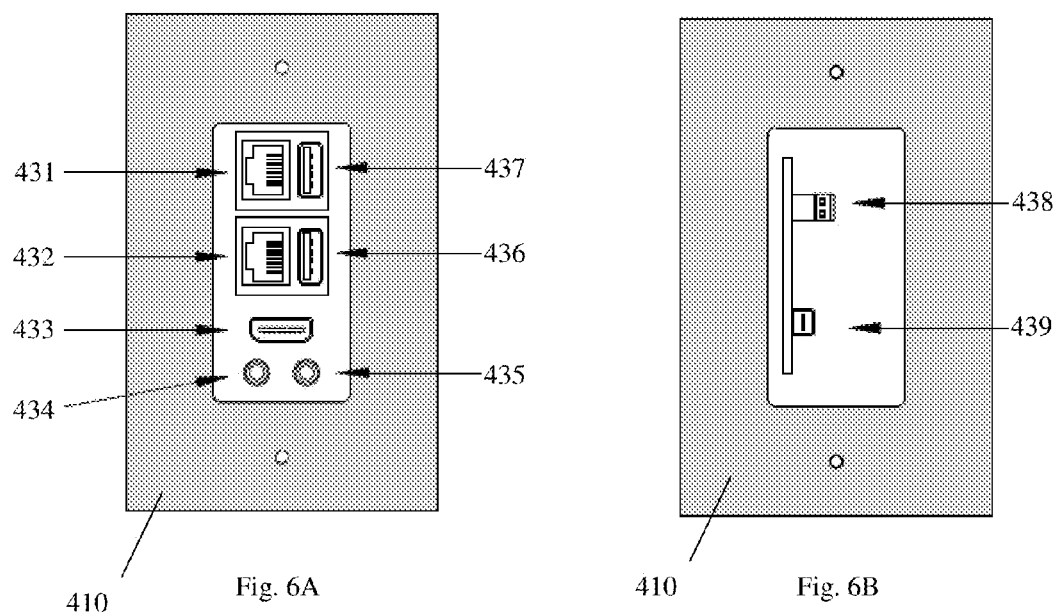

FIBER OPTIC CABLE WITH ELECTRICAL CONNECTORS AT BOTH ENDS, WALL PLATES AND CONTROL BOXES

BACKGROUND OF THE INVENTION

This invention relates to a data transmission cable using optical fibers and having electrical connectors at both ends, and related fabrication methods.

SUMMARY OF THE INVENTION

The present invention is directed to a connecting device for a fiber optic cable for converting electrical signals and optical signals to each other, and a cable device having a fiber optic cable and such connecting devices at both ends.

An object of the present invention is to provide such a connecting device with reduced size and increased flexibility.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a connecting device for a fiber optic cable, which includes: a first part having a first housing and first and second electrical connectors located on the first housing, and a second part having a second housing and a third electrical connector located on the second housing, wherein the second and third electrical connectors are adapted to be mechanically and electrically connect with each other or disconnected from each other, wherein the first part further includes electrical components disposed within the first housing and electrically connected to the first and second electrical connectors, wherein the second part receives end portions of optical fibers of the fiber optic cable, and wherein the second part further includes optical transceivers disposed within the second housing, the optical transceivers being electrically connected to the third electrical connector and optically coupled to the optical fibers.

In another aspect, the present invention provides a cable device which includes an optical fiber cable and two connecting devices at its two ends, at least one of the connecting devices having a structure described above.

In another aspect, the present invention provides a connecting device for a fiber optic cable, which includes: a first part including: a first housing; first and second electrical connectors located on the first housing; and electrical components disposed within the first housing and electrically connected to the first and second electrical connectors; and a second part including: a second housing adapted to receive end portions of a plurality of optical fibers of the fiber optic cable; a third electrical connector located on the second housing; and optical transceivers disposed within the second housing, the optical transceivers being electrically connected to the third electrical connector and adapted to be optically coupled to the plurality of optical fibers; wherein the second and third electrical connectors are adapted to be mechanically and electrically connect with each other or disconnected from each other, wherein the first housing forms an L shape with two arms, and wherein when the second and third electrical connectors are mechanically and electrically connected with each other, the second part is disposed adjacent to both of the two arms of the L shape in a space bound on two sides by the two arms, and wherein the first electrical connector complies with a predetermined standard.

In another aspect, the present invention provides a connecting device for a fiber optic cable, which includes: a wall plate including: a plate-shaped frame; one or more first electrical connectors disposed on a front side of the frame; one or more second electrical connectors disposed on a rear side of the frame; and electrical components electrically connected to the first and second electrical connectors; and a second part including: a housing adapted to receive end portions of a plurality of optical fibers of the fiber optic cable; a third electrical connector located on the housing; and optical transceivers disposed within the housing, the optical transceivers being electrically connected to the third electrical connector and adapted to be optically coupled to the plurality of optical fibers; wherein the third electrical connector is adapted to be mechanically and electrically connected with one of the second electrical connectors or be disconnected from it, and wherein each of the first plurality of electrical connectors complies with a predetermined standard.

In yet another aspect, the present invention provides a connecting system for a fiber optic cable, which includes: a first part including: a first housing having a box shape with a flat bottom surface; a plurality of first electrical connectors and a second electrical connector located on a side wall of the first housing; and electrical components disposed within the first housing and electrically connected to the first and second electrical connectors; and a second part including: a second housing adapted to receive end portions of a plurality of optical fibers of the fiber optic cable; a third electrical connector located on the second housing; and optical transceivers disposed within the second housing, the optical transceivers being electrically connected to the third electrical connector and adapted to be optically coupled to the plurality of optical fibers; wherein the second and third electrical connectors are adapted to be mechanically and electrically connect with each other or disconnected from each other.

It is to be understood that both the foregoing general description and the following detailed description are exemplary and explanatory and are intended to provide further explanation of the invention as claimed.

BRIEF DESCRIPTION OF THE DRAWINGS

FIGS. 3A-3C illustrate exemplary exterior views of a connecting device according to an embodiment of the present invention.

FIGS. 6A and 6B illustrate exemplary exterior views of a wall plate according to an embodiment of the present invention.

DETAILED DESCRIPTION OF THE PREFERRED EMBODIMENTS

Figure 1:
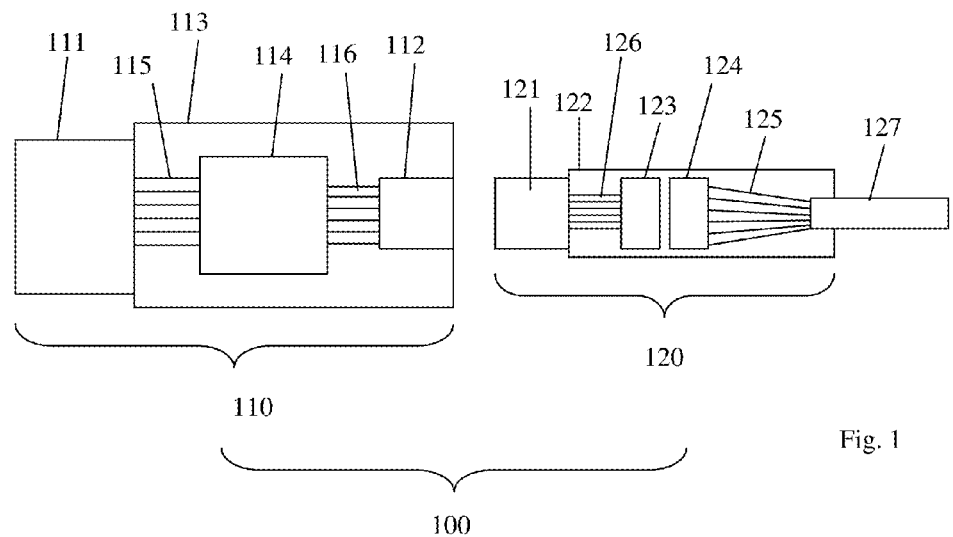
FIG. 1 schematically illustrates a connecting device for a fiber optic cable according to an embodiment of the present invention.
Figure 5A:
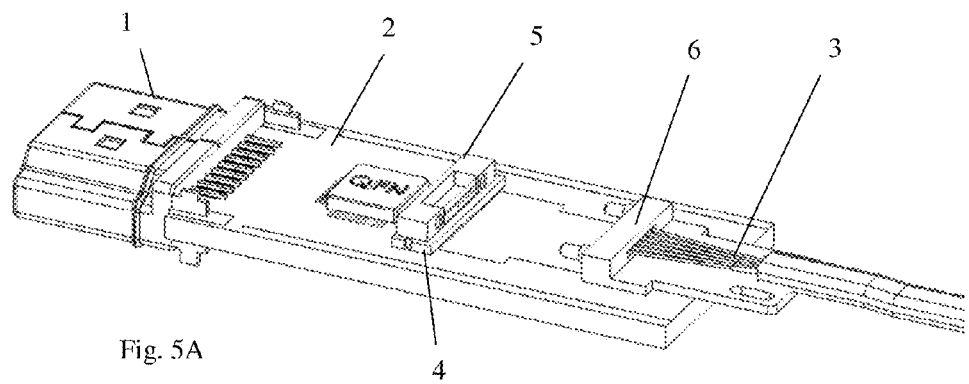
FIGS. 5A, 5B and 5C illustrate previously disclosed connecting devices.

Chinese utility model patent application No. 201020599351.6, filed Nov. 4, 2010 and granted on Jul. 20, 2011 as CN 201903673 U (hereinafter"the CN '673 patent"), is herein incorporated by reference in its entirety. FIGS. 1, 5a and 8f of the CN '673 patent are reproduced as FIGS. 5A, 5B and 5C of the present application. The disclosure of the CN '673 patent is summarized briefly below.

Figure 5B:
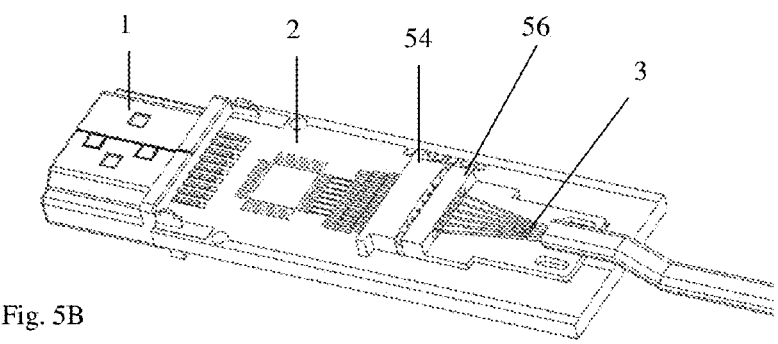
Figure 5C:
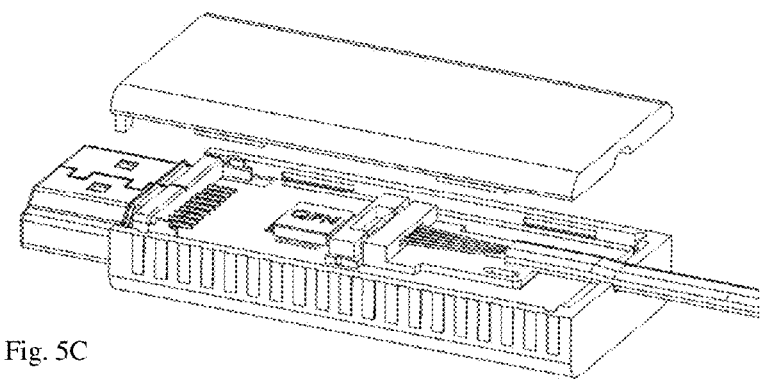

The CN '673 patent describes a connecting device for use with an optical fiber cable for data transmission. As shown in FIGS. 5A, 5B and 5C (FIGS. 1, 5a and 8f of the CN '673 patent), one end of the connecting device is provided with an electrical connector 1 which complies with a standard format such as HDMI (High Definition Multimedia Interface), VGA (Video Graphics Array), DP (DisplayPort), DVI (Digital Visual Interface), etc. The other end of the connecting device accommodates an optical fiber cable or optical fiber bundle. Various components are contained in a housing of the connecting device and mounted on a circuit board 2, and function to convert electrical signals from the electrical connector 1 into optical signals transmitted onto the optical fibers 3, and to convert optical signals from the optical fibers 3 into electrical signals transmitted onto the electrical connector 1. These internal components include, in the example shown in FIGS. 5A and 5C, a chip electrically connected to the electrical connector 1, for processing electrical signals; an optical transceiver block (not shown in FIGS. 5A and 5C) having multiple individual optical transceivers, electrically connected to the chip, for converting optical signals to electrical signals and vice versa; an optical component positioning block 4, for positioning the optical transceivers to the circuit board; a lens block 5, positioned on the optical component positioning block 4, for focusing and reflecting light signals between the optical transceivers and the optical fibers; and an optical fiber positioning block 6, for positioning the optical fibers to the lens block 5. FIG. 5A shows a state where the optical fiber positioning block 6 is not yet aligned with the lens block 5; FIG. 5C shows a state where the components are assembled an placed inside the housing but the top cover of the housing is still open. The example shown in FIG. 5B is similar to the example shown in FIG. 5A except that the multiple individual optical transceivers are directly mounted on the optical component positioning block 54 which faces the optical fiber positioning block 56, and the lens block is omitted.

Embodiments of the present invention improves the connecting device described in the CN '673 patent by separating the various internal components, which are contained in a single housing in the CN '673 patent, into two groups and arrange them in two separate housings. An embodiment of the present invention is schematically illustrated in FIG. 1 of the present disclosure.

As shown in FIG. 1, the connecting device 100 includes a first part 110 and a second part 120 adapted to be electrically and mechanically connected to each other. The first part 110 has a first electrical connector 111 and a second electrical connector 112 disposed on a housing 113. The first connector 111, which may be referred to as the external connector of the connecting device 100, is preferably one that complies with a standard format such as HDMI, VGA, DP, DVI, etc., similar to the electrical connector 1 of the previously disclosed connector device shown in FIGS. 5A-5C. Contained inside the housing 113 are one or more electrical components such as a chip 114 for processing electrical signals. The chip 114 is electrically connected to the first electrical connector 111 by a first set of wires 115, and to the second electrical connector 112 by a second set of wires 116. The chip and the wires may be formed on a circuit board enclosed in the housing 113.

The second part 120 of the connecting device 100 has a first electrical connector 121 disposed on a housing 122. The first electrical connector 121 is designed to electrically and mechanically connect with the second electrical connector 112 of the first part 110. The connectors 112 and 121 are not required to comply with any commonly recognized standard, so long as they can mate with each other. Contained inside the housing 122 are an optical transceiver block 123 including a plurality of optical transceivers (such as laser diodes (LD) and/or photo detectors (PD)), and an optical fiber positioning block 124 for receiving and positioning a set of optical fibers 125 from an optical fiber cable 127. The optical transceivers, which are electrically connected to the first electrical connector 121 by a set of wires 126, convert optical signals to electrical signals and vice versa. The optical fiber positioning block 124 positions the end of the optical fibers 125 relative to the optical transceivers such that light signals are transmitted between the optical transceivers and the optical fibers. Either the optical transceiver block 123 or the optical fiber positioning block 124 or both may include optical elements such as lenses, reflectors, etc. to direct the light signals. Preferably, the optical fibers 125 include multiple fibers for transmitting various signals. In one example, six optical fibers are used for transmitting HDMI signals, four of which carry the Tc, T0, T1 and T2 signals, and two carry the SCL, SDA, HPD, CEC, and ARC signals in a multiplexed manner. The chip 114 carries out the necessary multiplexing/demultiplexing functions.

The optical transceiver block 123 and the optical fiber positioning block 124 may have any suitable structures. In one example, the optical transceiver block 123 has a structure similar to the combined structure of the an optical component positioning block 4, the a lens block 5, and the optical transceiver block shown and described in FIGS. 5A and 5C. In another example, the optical transceiver block 123 has a structure similar to the optical component positioning block 54 shown and described in FIG. 5B. In one embodiment, the optical fiber positioning block 124 has a structure similar to the optical fiber positioning block 6 shown and described in FIG. 5A, or the optical fiber positioning block 56 shown and described in FIG. 5B. Other suitable structures may be used as well.

In the previously disclosed structures shown in FIGS. 5A-5C, the optical transceivers are electrically connected to the chip by wires. In effect, the embodiment shown in FIG. 1 of the instant disclosure divides the components of shown in FIGS. 5A-5C into two groups at the location of these wires, and locate the two groups of components in two separate housings 113 and 122 with appropriate electrical connector to connect the two. Preferably, in embodiments of the present invention, most or all electrical signal processing circuitry, including generating drive signals for the laser in the optical transceiver, is located in the first housing 113, so the second housing 122 contains very little or no electrical signal processing circuitry, enabling the size of the second housing to be minimized. All components related to transmitting and processing of optical signals are located in the second housing. The connection between the two housings only involves electrical connection.

In the embodiment illustrated in FIG. 1, the first electrical connector 111 for the first part 110 is a male connector, but it may also be a male connector. Further, the second electrical connector 112 of the first part 110 is a female connector and the first electrical connector 121 of the second part 120 is a female connector, but the reverse structure may be used.

Figure 2:
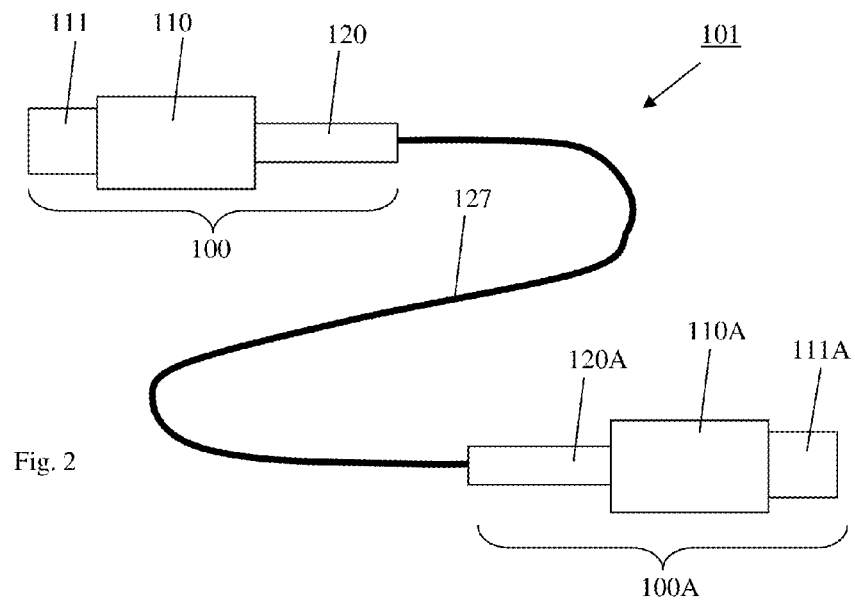
FIG. 2 schematically illustrates a fiber optic cable device having two connecting devices at its ends according to an embodiment of the present invention.

FIG. 2 illustrate an embodiment of the present invention which is a cable device 101 having an optical fiber cable 127 and two connecting devices 100, 100A at its two ends. Typically, the two connecting devices 100, 100A are not identical because one end of the cable device 101 is primarily a transmitting end and the other end is primarily a receiving end (even though different signals may be transmitted in different directions simultaneously). In the example shown in FIG. 2, each connecting device 100, 100A is formed of two parts as described above. Alternatively, one connecting device (e.g. 100) may be formed of two parts while the other (e.g. 100A) may be formed of a single part similar to that of the previously disclosed connector device shown in FIGS. 5A-5C.

The external connectors 111 and 111A and the electronic components within the connecting devices 100 and 100A may be the same or different. When they are different, the cable device may function as an adaptor or converter, which converts electrical signals complying with one standard to electrical signals complying with a different standard. When the two external connectors 111 and 111A are the same or comply with the same standard, the cable device may function as an extender or connector cable to connect two external devices located remotely with respect to each other. For example, one practical application of the cable device 101 is an HDMI to HDMI fiber optic connector for connecting a TV at one end (the receiving end) and a DVD player or another source device at the other end (the transmitting end).

In one particular example, the cable device 101 is an adaptor with an Apple Lightening connector, or an Apple 30-pin connector, or an MHL (Mobile High-Definition Link) connector at one end, and an HDMI connector at the other end. Such a cable will allow an Apple device such as iPad™, iPhone™ and iPod™ or other mobile devices to be connected to an HDTV or other HDMI-compatible display device, so that the images seen on the mobile device can be displayed on the screen of the HDTV or the other HDMI-compatible device. Lightening and 30-pin are two types of connectors used by various versions of Apple's iPad™, iPhone™ and iPod™ devices. MHL is a standard mobile audio/video interface. The signal conversion schemes between Lightening, 30-pin or MHL and HDMI are known, as Lightning connector to HDMI adaptors, 30-pin connector to HDMI adaptors and MHL to HDMI adaptors are known and commercially available from various sources, even though these adaptors use electrical rather than optical cables for signal transmission. In such an adaptor cable, either the Lightening or 30-pin connector, or the HDMI connector, or both, may be made as a two-part structure by implementing embodiments of the present invention.

Referring back to FIG. 1, forming the connecting device 100 in two parts 110 and 120 offers many advantages. First, by locating the electrical components 114 and the external connector 111 in a detachable first part 110, the second part 120 contains very little or no electrical signal processing circuitry; thus, the size of the second part 120 can be reduced, so that it can be much smaller than the previously disclosed connector device shown in FIGS. 5A-5C. For example, the size of the second part 120 can be smaller than 0.35 by 0.25 by 0.75 inches. When connecting two external devices located remotely to each other, the cable device 101 often needs to be passed through narrow passages in a building, such as conduit inside walls of the building. To pass through a pipe having a limited size, the first part 110 can be detached, and the second part 120 with the cable 127 can be passed through the pipe more easily. For example, many older residential buildings have pipes of 0.5 inches in diameter with 90 degree turns. It would have been very difficult or impossible to pass the previously disclosed connector shown in FIGS. 5A-5C through such conduit, whereas the second part 120 of the embodiments of this invention can easily pass through such conduit. After the second part 120 is passed through the conduit, the first part 110 is attached to the second part 120 and the connecting device 100 is ready to be connected to an external device.

Second, in the embodiment of the present invention shown in FIG. 1, the first part 110 of the connecting device 100 contains only electrical components and no optical components. Therefore, it can be fabricated more easily and reliably using mature technologies, which reduces the cost of the overall cable device.

Further, because the connection (i.e. connectors 112 and 121) between the first part 110 and second part 120 is s pure electrical connection without involving any optical signals, the connection is not prone to problems relating to connecting two optical fibers.

It should be noted that FIGS. 1 and 2 of the instant disclosure are only intended as schematic illustrations; they do not necessarily represent the actual shape, size or spatial arrangements of the various components. For example, while the fibers 125 are shown in FIG. 1 as being fanned out, they are not limited to this configuration, and they may go straight out to the LD or PD.

Two particular embodiments of the connecting device are illustrated in FIGS. 3A-3C and FIGS. 4A-4C. Each connecting device 200, 300 can be used as the connecting device 100 or 100A in the cable device 101 shown in FIG. 2. In FIGS. 1-4C, like components are labeled with like numbers, with the third digit from the right being different; for example, components 211 and 311 are similar to component 111.

FIGS. 3A-3C illustrates exemplary exterior views of a connecting device 200 according to one particular embodiment of the present invention. The connecting device 200 includes a first part 210 and a second part 220 which have internal structures similar to those of the first and second parts 110 and 120 shown in FIG. 1. FIG. 3A shows the two parts 210 and 220 being uncoupled from each other, and FIG. 3B shows the two parts being coupled to each other. FIG. 3C illustrates the front, side and top views of the connecting device 200.

In this particular embodiment, the first part 210 has a housing that is generally rectangular, where the external connector 211 extends from a first side of the housing and the connector 212 is located at a second side of the housing opposite the first side. When the electrical connector 221 of the second part 220 is connected to the electrical connector 212 of the first part 210, the overall length of the connecting device 200 (indicated as L in FIG. 3C, which is the dimension in a longitudinal direction of the external connecter 211 between the first side of the housing and the end of the cable 227) is approximately the length of the first part 210 plus the length of the second part 220, while the overall width of the connecting device 200 (indicated as W in FIG. 3C, which is a dimension in a transverse direction) is the larger of the width of the first part 210 and the width of the second part 220.

The form factor of the connecting device 200 shown in FIGS. 3A-3C is suitable when the external connector 211 complies with the HDMI standard. An HDMI male connector has a width of about 13.9 mm (Type A), or 10.42 mm (Type C), or 6.4 mm (Type D). The second part 220 may have a width of about 9 mm to accommodate the transceivers and various optical components. The width of the first part 210 can be about 20 mm to accommodate the various electrical components. Thus, the overall width of the connecting device 200 can be quite small.

Figure 4A:
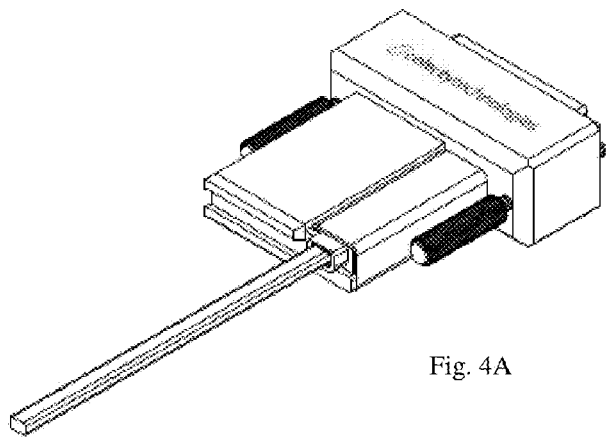
FIGS. 4A-4C illustrate exemplary exterior views of another connecting device according to an embodiment of the present invention.
Figure 4B:
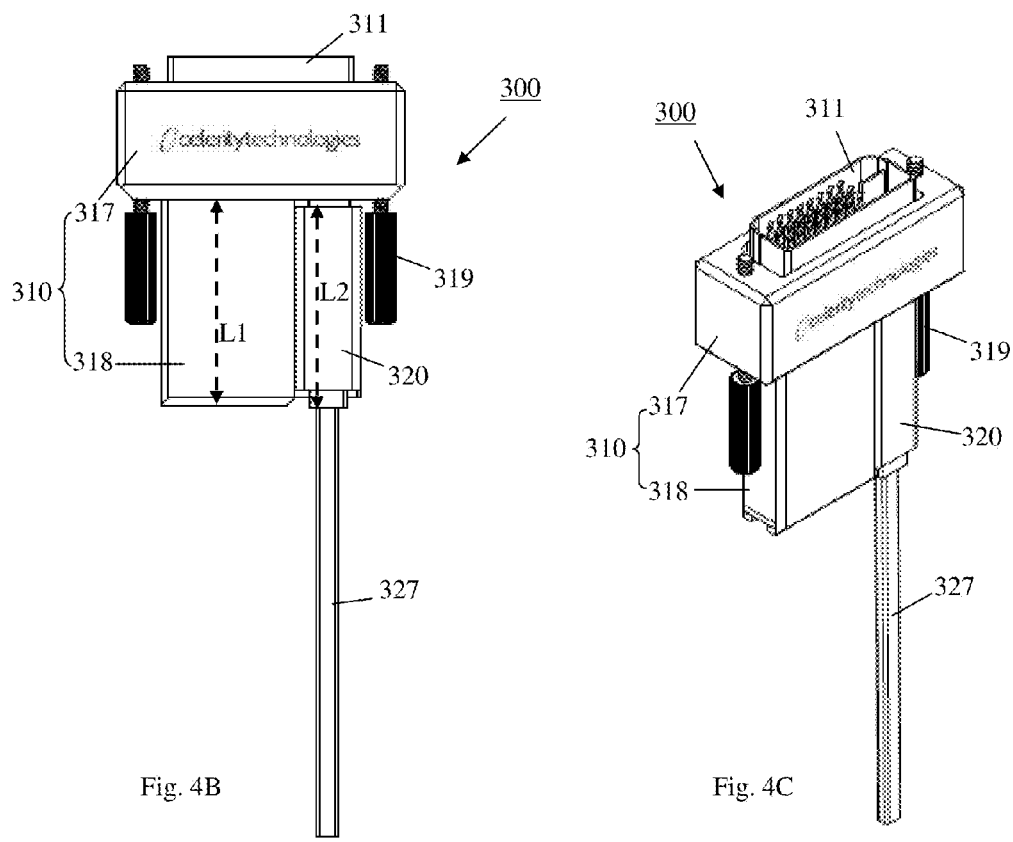
Figure 4C:
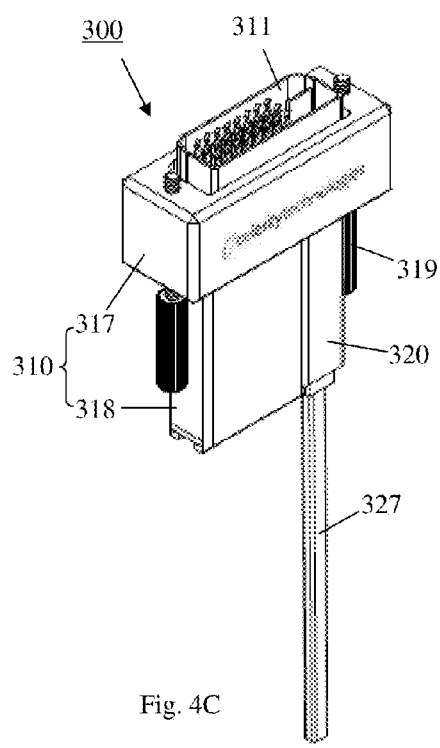

FIGS. 4A-4C illustrates exemplary exterior views of another connecting device 300 according to another particular embodiment of the present invention. The connecting device 300 includes a first part 310 and a second part 320 which have internal structures similar to those of the first and second parts 110 and 120 shown in FIG. 1. FIG. 4A shows the first part 310 and second part 320 (with the optical fiber cable 327) being uncoupled from each other, and FIGS. 4B (front view) and 4C (perspective view) show the two parts being coupled to each other.

In terms of the exterior shape, the first part 310 is formed by two blocks 317 and 318 joined together. They can be joined together by being formed separately and joined or attached together or by being formed integrally. The first block 317 has a generally rectangular shape in the front view (FIG. 4B), where the external connector 311 extends from a first end of it while the second block 318 is joined to the second end of it opposite the first end. The second block 318, which houses some or all of the electronic circuits of the first part 310, does not occupy the entirety of the second end of the first block 317, leaving an area of the second end where the electrical connector 312 of the first part 310 is exposed. When the second part 320 is connected to the first part 310, the electrical connector 321 of the second part is connected to the electrical connector 312 of the first part; the second part 320 is located adjacent to the second block 318 of the first part 310, both extending from the second end of the first rectangular block 317. In the illustrated embodiment, both the second block 318 and the second part 320 are generally rectangular in shape, but this is not required and they may have other shapes, such as tapered shapes, etc. The second part 320 has a length L2 substantially the same as or shorter than the length L1 of the second block 318, measured in a longitudinal direction of the external connecter 311, as indicated by the double-arrow dashed lines in FIG. 4B. Moreover, the sum of the width of the second block 318 and the width of the second part 320, measured in a transverse direction perpendicular to the longitudinal direction, is less than the width of the first block 317. Therefore, the overall length and width of the connecting device 300, when the second part 320 is connected with the first part 310, are substantially the same as the overall length and width of the first part 310 alone.

Described in more general terms, the housing of the first part 310 generally has an L shape in the front view, and when the second part 320 is electrically and mechanically connected to the first part, the second part is disposed adjacent to both of the two arms of the L shape in a space bound on two sides by the two arms.

The form factor of the connecting device 300 shown in FIGS. 4A-4C is suitable when the external connector 311 complies with the DVI standard. A DVI male connector has a width of about 25.4 mm. The DVI standard further requires two mounting screws, one on each side of the male connector, and the distance between the two screws is about 33 mm. The width of the second part 320 is about 9 mm to accommodate the transceivers and various optical components. Thus, the width of the second block 318 can be up to about 20 mm, which is sufficient to accommodate the various electrical components. The length of the second block 318 and the second part 320 should be as short as possible; in one implementation, the length is about 25 mm, and the overall length of the connecting device 300, between the first end of the first part 310 where the external connector 311 protrudes from and the end of the cable, is about 35 mm. This is shorter than can be accomplished if the second part 320 were plugged into a connector located at the end of the entire first part 310 (i.e. the end of the second block 318 opposite the external connector 311).

Making the overall length of the connecting device 300 shorter is desirable for practical purposes. When the connecting device is connected to a device, such as a TV, the connector 311 is often plugged into a mating connector on the back panel of the TV. Making the overall length of the connecting device 300 as short as possible will reduce the free space needed behind the TV, which is desirable especially for wall-mounted flat screen TVs. For some TVs the connector 311 is plugged into a horizontal panel of the TV near the bottom, so if the connecting device 300 is too long, it may extends too far down and extends out of the lowest edge of the TV to become visible from the front, which is undesirable.

FIGS. 6A (front view) and 6B (rear view) schematically illustrate another embodiment of the present invention, where the first part 110 of the connecting device 100 is in the form of a wall plate 410 intended to be installed in a wall of a building. The wall plate 410 has a plate-shaped frame made of a suitable material such as plastic and/or metal and adapted to be mounted to a wall of a building, and a number of connecters secured to the frame. The front side of the wall plate 410 (FIG. 6A) has a network (e.g. Ethernet) connector 431, an RS232 connector 432 (e.g. RJ45 via an adapter used as RS232 connector), an HDMI connector 433, an infrared emitter connector 434, an infrared detector connector 435, a USB (Universal Serial Bus) connector 436, and a power connector 437 which is also a micro USB connector. The rear side of the wall plate 410 (FIG. 6B) has a power input connector 438, and a fiber cable connector 439 which connects to the second part 120 of the connecting device (see FIG. 1, not shown in FIG. 6B). The size of the wall plate frame may be, for example, 75 mm by 120 mm and the area within which the connectors 431-437 are located may be, for example, about 34 mm by 68 mm.

While some specific connectors are shown in FIG. 6A, the wall plate 410 may be provided with other types of connectors, including audio, mic or BNC. The present invention is not limited to the specific types of connectors on the wall plate.

In use, two wall plates are installed, typically at different locations of a building, such as different rooms, and the fiber cable connectors 439 of the two wall plates are connected to each other by a connecting cable, which includes an optic fiber cable 127 and two second parts 120 at both ends (see FIGS. 1 and 2). This configuration is the same as that shown in FIG. 2 except that the first part 100 and 100A in FIG. 2 are now the wall plates 410. Typically, one wall plate is a transmitting end and the other is a receiving end; they have different electrical components for signal conversion and processing, but the same exterior connectors. At the transmitting end, devices such as computers, DVD players, etc. can be connected to desired connectors on the front side of the wall plate using appropriate cables (Ethernet, RS232, HDMI, USB, etc.). At the receiving end, devices such as TVs, etc. can be connected to desired connectors on the front side of the wall plate using appropriate cables. The system including the two wall plates and the connecting cable are useful in offices, conference rooms, homes, etc.

Figure 6C:
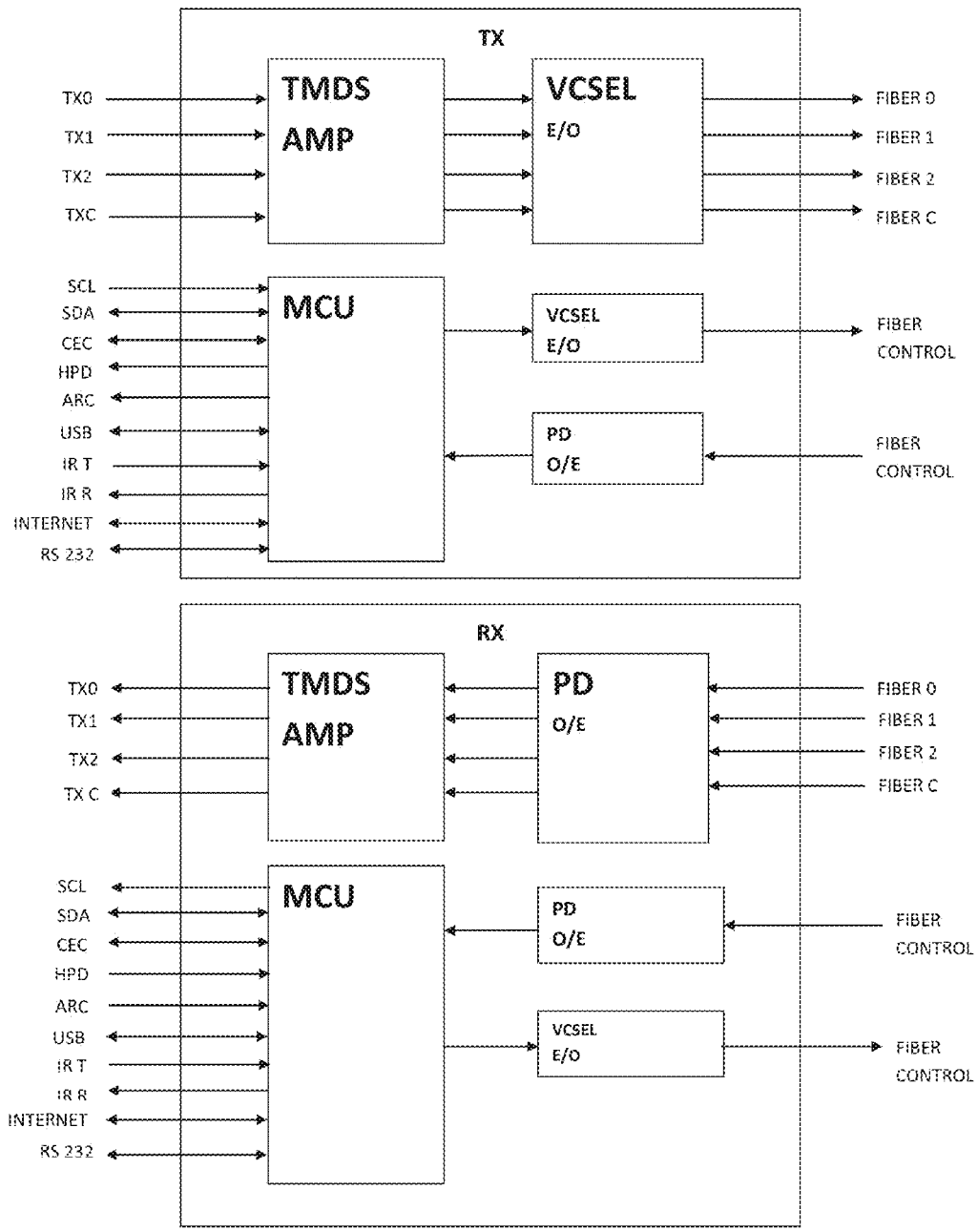
FIG. 6C schematically illustrates an example of the electrical components inside the wall plate.

Electrical circuits are provided in the wall plate 410 to couple signals between the fiber cable connector 439 and the various connectors on the front side including the network connector 431, the RS232 connector 432, the HDMI connector 433 and the USB connector 436. The electrical circuits in the wall plates for the transmitting end and receiving end may be different. FIG. 6C schematically illustrates an example of the electrical components inside the wall plate 410, for the transmitting end (TX) and receiving end (RX). In FIG. 6C, six optical fibers labeled FIBER 0, FIBER 1, FIBER 2 and FIBER C, and FIBER CONTROL are shown to the right of the TX and RX blocks. The electrical signals are shown to the left of the TX and RX blocks. The electrical signals include data signals TX0, TX1, TX2, and TXC of the HDMI signal, control signals SCL, SDA, CEC, HPD and ARC of the HDMI signal, as well as USB signals, infrared receiver signal IR T and infrared detector signal IR R, network signal ("INTERNET"), and RS232 signals. The arrows indicate the direction of transmission of the various signals. "TMDS AMP" represents a TMDS amplifier; MCU represents a microcontroller unit which processes the electrical signals; "VCSEL E/O" represents a vertical-cavity surface-emitting laser electro-optic converter, which is used to convert electrical signals to optical signals; and "PD" represents a photo detector which is used to convert optical signals to electrical signals. Note that the USB signals for the USB connector 436, the IR T signal for the infrared detector connector 435, the IR R signal for the infrared emitter connector 434, the network signal for the network connector 431, and the RS232 signal for the RS232 connector 432 are carried by the same pair of FIBER CONTROL optical fibers.

For a connecting device that only has an HDMI connector and no USB, etc. connectors, the internal components will be similar to that shown in FIG. 6C, but the USB, IR T, IR R, INTERNET and RS232 signals will not be present.

For the wall plate 410, either the USB power connector 437 or the power input connector 438 can be used to supply power to the circuits in the wall plate 410. In a first configuration, the power input connector 438 is connected to a power supply, such as a 5V power supply. In this configuration, the USB power connector 437 can be used as a power source to supply power to another device via a USB cable. In a second configuration, the USB power connector 437 is connected to a power source via a USB cable to supply power to the wall plate. In this configuration, the power input connector 438 is not used.

Figure 7:
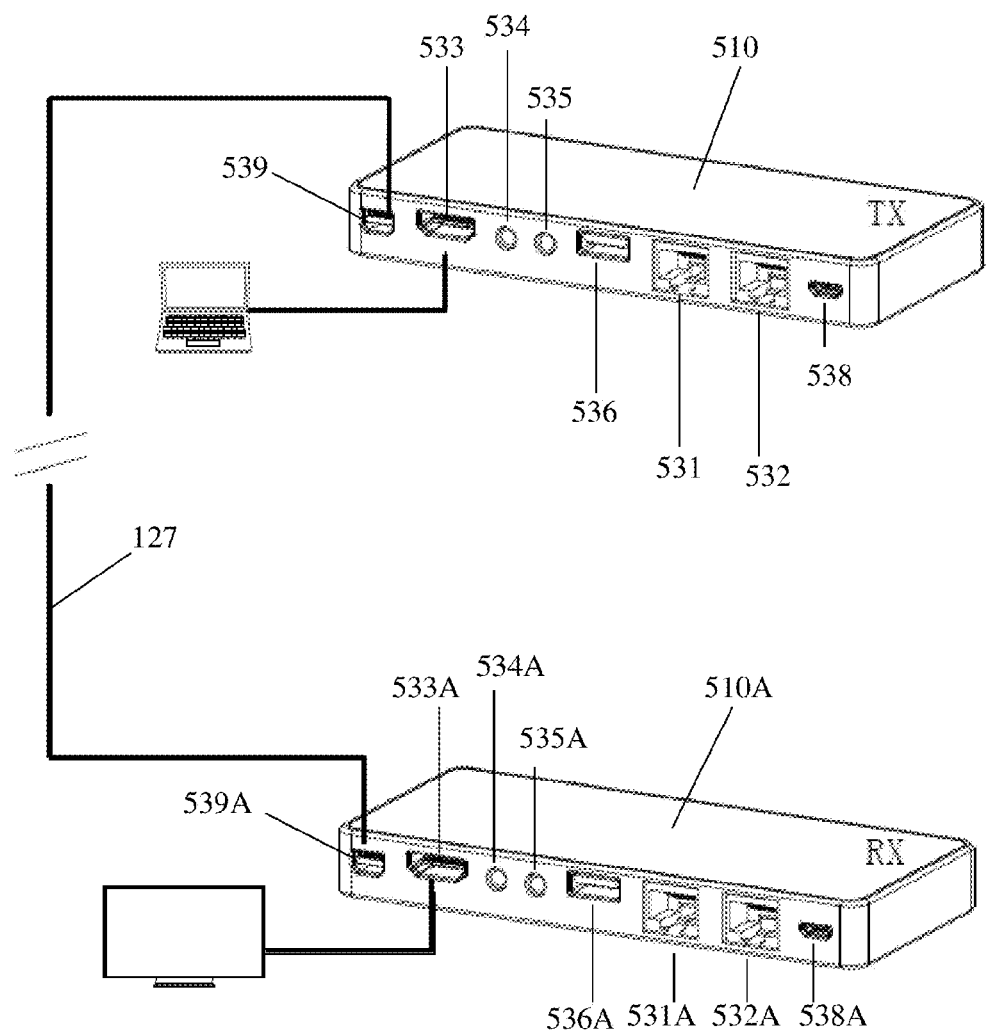
FIG. 7 schematically illustrates a fiber optic cable system according to yet another embodiment of the present invention.

FIG. 7 schematically illustrates another embodiment of the present invention, where the first part 110 of the connecting device 100 is in the form of a standalone box, referred to as a control box. In FIG. 7, the transmitting end control box is labeled 510 and the receiving end control box is labeled 510A. The transmitting end control box 510 has on its housing a number of connectors including a network (e.g. Ethernet) connector 531, an RS232 connector 532, an HDMI connector 533, an infrared emitter IR_E 534, an infrared detector IR_D 535, a USB connector 536, a fiber cable connector 539, and a power input connector 538. The receiving end control box 510A has a similar set of connectors 531A to 536A, 538A and 539A. Other types of connectors may be provided on the control box, such as audio, mic or BNC.

In the particular embodiment shown in FIG. 7, the control boxes have a flat bottom surface, and the connectors are arranged on side walls of the box. In one implementation, the size of the box is approximately 136 mm by 60 mm by 15 mm. Other sizes may be used. The lower limit of the size is generally limited by the number and types of connectors provided.

In use, the control boxes 510 and 510A are connected together by a connecting cable, which includes an optic fiber cable 127 and two second parts 120 (not shown) at both ends, connected with the fiber cable connectors 539 and 539A of the control boxes 510 and 510A, respectively. A device such as a computer, DVD player, etc. is connected to a desired connector on the transmitting end control box 510, such as connectors 531, 532, 533, or 536, and a device such as a TV is connected to a desired connector on the receiving end control box 510A, such as connectors 531A, 532A, 533A, or 536A. The power input connectors 538, 538A are connected to appropriate power supplies. The system including the two control boxes and the connecting cable are useful in offices, conference rooms, homes, etc.

Electrical circuits, similar to those in the wall plates 410 described earlier (see, e.g., FIG. 6C), are provided in the control boxes 510/510A to couple signals between the fiber cable connector 539 and the various other connectors including the network connector 431, the RS232 connector 432, the HDMI connector 433 and the USB connector 436. The electrical circuits in the transmitting end control box and the receiving end control box may be different.

To summarize, in various embodiments of the present invention, the connecting device for a fiber optic cable has two mechanically separate parts; the first part contains electrical components and no optical components, for connecting with an external device, while the second part contains optical components and optical transceivers to convert optical signals to electrical signals and vice versa but contains little or no electrical signal processing circuit. The second part has a small size, while the first part may have various form factors suitable for different kinds of applications.

It will be apparent to those skilled in the art that various modification and variations can be made in the connecting device and related methods of the present invention without departing from the spirit or scope of the invention. Thus, it is intended that the present invention cover modifications and variations that come within the scope of the appended claims and their equivalents.

What is claimed is:

1. A connecting device for a fiber optic cable, comprising:
   a first part comprising:
      a first housing;
      first and second electrical connectors located on the first housing; and
      electrical components disposed within the first housing and electrically connected to the first and second electrical connectors; and
   a second part comprising:
      a second housing adapted to receive end portions of a plurality of optical fibers of the fiber optic cable;
      a third electrical connector located on the second housing; and
      optical transceivers disposed within the second housing, the optical transceivers being electrically connected to the third electrical connector and adapted to be optically coupled to the plurality of optical fibers;
   wherein the second and third electrical connectors are adapted to be mechanically and electrically connect with each other or disconnected from each other, wherein the first housing forms an L shape with two arms, and wherein when the second and third electrical connectors are mechanically and electrically connected with each other, the second part is disposed adjacent to both of the two arms of the L shape in a space bound on two sides by the two arms, and
   wherein the first electrical connector complies with a predetermined standard.

2. The connecting device of claim 1, wherein the L shape of the first housing includes a first block having a first end from which the first electrical connector extends, and a second block containing the electrical components and joined to the first block at a second end of the first block opposite the first end, wherein the second electrical connector is disposed on the second end of the first block, and wherein when the second and third electrical connectors are mechanically and electrically connected with each other, the second part is located adjacent the second block.

3. The connecting device of claim 1, wherein the second part further includes an optical fiber positioning block for receiving and positioning the end portions of the plurality of optical fibers of optical fiber cable relative to the optical transceivers.

4. The connecting device of claim 1, wherein the predetermined standard is DVI.

5. The connecting device of claim 1, wherein the second part is smaller than 0.35 by 0.25 by 0.75 inches in size.

6. The connecting device of claim 1, wherein the second part contains no electrical signal processing circuitry.

7. A connecting device for a fiber optic cable, comprising:
   a wall plate comprising:
      a plate-shaped frame;
      one or more first electrical connectors disposed on a front side of the frame;
      one or more second electrical connectors disposed on a rear side of the frame; and
      electrical components electrically connected to the first and second electrical connectors; and
   a second part comprising:
      a housing adapted to receive end portions of a plurality of optical fibers of the fiber optic cable;
      a third electrical connector located on the housing; and
      an optical transceiver block including optical transceivers disposed within the housing, the optical transceivers being electrically connected to the third electrical connector and adapted to be optically coupled to the plurality of optical fibers;
   wherein the third electrical connector is adapted to be mechanically and electrically connected with one of the second electrical connectors or be disconnected from it, and
   wherein each of the first plurality of electrical connectors complies with a predetermined standard,
   wherein the electrical components of the wall plate include electrical circuitry for generating drive signals for the optical transceivers of the second part, wherein the second part contains no electrical signal processing circuitry, and wherein the second housing is smaller than 0.35 by 0.25 by 0.75 inches in size.

8. The connecting device of claim 7, wherein the second part further includes an optical fiber positioning block for receiving and positioning the end portions of the plurality of optical fibers of optical fiber cable relative to the optical transceivers.

9. The connecting device of claim 7, wherein each of the one or more first electrical connectors is selected from a group consisting of: Ethernet connector, RS232 connector, HDMI connector, and USB connector.

10. The connecting device of claim 7, wherein another one of the second electrical connectors is a power connector for supplying power to the wall plate.

11. A connecting system for a fiber optic cable, comprising:
   a first part comprising:
      a first housing having a box shape with a flat bottom surface;
      a plurality of first electrical connectors and a second electrical connector located on a side wall of the first housing; and
      electrical components disposed within the first housing and electrically connected to the first and second electrical connectors; and
   a second part comprising:
      a second housing adapted to receive end portions of a plurality of optical fibers of the fiber optic cable;
      a third electrical connector located on the second housing; and
      an optical transceiver block including optical transceivers disposed within the second housing, the optical transceivers being electrically connected to the third electrical connector and adapted to be optically coupled to the plurality of optical fibers;
   wherein the second and third electrical connectors are adapted to be mechanically and electrically connect with each other or disconnected from each other,
   wherein the electrical components disposed within the first housing include electrical circuitry for generating drive signals for the optical transceivers of the second part, wherein the second part contains no electrical signal processing circuitry, and wherein the second housing is smaller than 0.35 by 0.25 by 0.75 inches in size.

12. The connecting system of claim 11, wherein the second part further includes an optical fiber positioning block for receiving and positioning the end portions of the plurality of optical fibers of optical fiber cable relative to the optical transceivers.

13. The connecting system of claim 11, wherein each of the first plurality of electrical connectors is selected from a group consisting of: Ethernet connector, RS232 connector, HDMI connector, and USB connector.

* * * * *